(12) United States Patent
Satou

(10) Patent No.: US 7,023,588 B2
(45) Date of Patent: Apr. 4, 2006

(54) IMAGE READING APPARATUS

(75) Inventor: Tetsuya Satou, Kawasaki (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 813 days.

(21) Appl. No.: 09/948,668

(22) Filed: Sep. 10, 2001

(65) Prior Publication Data

US 2003/0048488 A1 Mar. 13, 2003

(51) Int. Cl.
H04N 1/04 (2006.01)
H04N 1/00 (2006.01)
G02B 1/02 (2006.01)

(52) U.S. Cl. .................. 358/483; 358/482; 358/471; 358/474; 358/497; 358/406; 359/819; 359/822

(58) Field of Classification Search .............. 358/482, 358/483, 512–514, 471, 474, 505, 506, 487, 358/400, 475, 509, 406, 504, 497; 250/239, 250/216, 559.3, 208.1, 234–236; 359/819, 359/822, 823, 825, 827, 829; 235/439
See application file for complete search history.

(56) References Cited

U.S. PATENT DOCUMENTS 5,715,099 A * 2/1998 Takemoto ................... 359/819
5,903,401 A   5/1999 Tanaka et al. .............. 359/806
5,933,248 A * 8/1999 Hirata ........................ 358/406
5,936,239 A * 8/1999 Tsai et al. ................... 250/239
6,073,844 A * 6/2000 Tsai et al. ................... 235/439
6,157,467 A * 12/2000 Tsai .......................... 358/483
6,239,885 B1* 5/2001 Sato et al. .................. 358/483

FOREIGN PATENT DOCUMENTS

| JP | 9-191357   | 7/1997 |
| JP | 11-98313   | 4/1999 |
| JP | 2000-255828 | 9/2000 |

* cited by examiner

Primary Examiner—Cheukfan Lee
(74) Attorney, Agent, or Firm—Foley & Lardner LLP

(57) ABSTRACT

An apparatus for reading an image comprises an original mounting table for mounting an original, a first carriage which has a light source for irradiating light to the original and an optical system for guiding original-image light reflected from the original, and which moves along the original mounting table, a lens unit having a lens into which the original-image light enters and placed immediately under a passage on which the first carriage moves, a CCD assembly for receiving the original-image light passed through the lens and reading an image corresponding to the original-image light, a lens bracket cover having a bracket portion to which the CCD assembly is attached and a cover portion for covering the lens unit, and a lens base having the bracket portion of the lens bracket cover attached thereto, for supporting the lens unit.

11 Claims, 7 Drawing Sheets

IMAGE READING APPARATUS

BACKGROUND OF THE INVENTION

The present invention relates to an image reading apparatus such as a digital copying machine, and more particularly, improvement of a scanner unit.

An original glass 5 serving as an original-placing portion is formed on the upper surface portion of a copying machine main body. The original glass 5 is covered with an open/close cover 6. When an original 2 such as document is copied, the open/close cover 6 is opened as shown in FIG. 1, and the original 2 is placed on the left-hand side of the original glass 5. At the time, if noise light 7 outside the original glass 5 and light 8 reflected from a light radiation lamp (not shown) enter into a lens unit, a defective image 4, namely, a hollow image, parts of which are faint, is produced on a copying paper sheet, as shown in FIG. 2.

To prevent the ambient light 7 and the reflection light 8 from entering into the lens unit 20, a light-shield cover 40 is attached to the lens unit 20 in a conventional scanner unit 100, as shown in FIGS. 3 and 7. The lens cover 40 covers the lens unit 20 together with a CCD assembly 30.

In the scanner unit 100, a board cover 50 is provided so as to cover a scanner electrical circuit board 55. The board cover 50 is arranged next to the lens cover 40. The upper surfaces of the board cover 50 and the lens cover 40 are placed at the same level (height). A first carriage 70 moves in the space right above both covers 40 and 50. On the other hand, a second carriage (not shown) moves solely in a side space of the lens cover 40 (the left-half side space in FIG. 7). The moving stroke (length) of the second carriage is approximately half the width of the scanner unit 100.

Incidentally, the scanner unit 100 sends the image of the original projected by a mirror (not shown) to a lens 25, through which the image can be read by a CCD 36. To send the image from the lens 25 to the CCD 36 without fail, the lens unit 20 must be securely positioned relative to other optical units. Thus, the lens unit 20 is fitted onto a lens base 10 and has position-adjusting mechanisms 16, 22, 23, 33a and 33b. The lens unit 20 is positioned accurately to other optical units in the directions of an X-axis, Y-axis, and Z-axis by the position adjusting mechanisms 16, 22, 23, 33a and 33b.

However, the conventional scanner unit 100 has the following problems (1) to (3).

(1) Since the lens cover 40 is used for covering both the lens unit 20 and the CCD assembly 30, and the board cover 50 is used for covering the scanner electrical board 55, the total size of both the covers 40 and 50 approximately equates half the size of the scanner unit 100 (see FIG. 7). The lens cover 40 itself requires sheet-metal working, which incurs costs. In addition, a number of screws 9 are required for fixing the lens cover 40 onto a base frame 80 (FIG. 3). The cost for fitting the lens cover 40 to the base frame 80 must be added. As a result, the total cost becomes high.

(2) Since the lens cover 40 must be removed from the base frame 80 every time rescaling of the CCD 36 is performed and the lens unit 20 is exchanged, time and labor are required for removing the screws 9. Furthermore, since an original detection sensor 44 and a cooling fan 42 are attached to the lens cover 40, harnesses 60 of electrical parts 42 and 44 have to be removed from a harness clamp 61 (see FIG. 3). This requires a great deal of time and labor and thus lowers the serviceability.

(3) The lens cover 40 must have an allowance in height. As the allowance, the margin for a height-adjusting stroke of a CCD board 31+α is required. Due to this, a clearance G1 between the upper surface of the lens cover 40 and the lowermost portion of the first carriage 70 restricted down to 1 to 1.5 mm (see FIG. 7). Since the clearance G1 is extremely narrow, if the lens cover 40 and the first carriage 70 are erroneously fixed at positions far away from the correct positions, the first carriage 70 may hit the lens cover 40 when moved. For this reason, the lens cover 40 and the first carriage 70 must be precisely fixed. On the other hand, when the first carriage 70 is positioned further upward in order to increase the clearance G1, the overall height of the scanner unit 100 increases. As a result, the space occupied by the whole machine increases. This goes against the requirements for miniaturization.

BRIEF SUMMARY OF THE INVENTION

An object of the present invention is to provide an image reading apparatus being excellent in performance, having a smaller-spaced scanner unit including a lens unit and a carriage, and manufactured at a low cost.

The image reading apparatus of the present invention comprises:

an original mounting table for mounting an original;

a first carriage which has a light source for irradiating light to the original and an optical system for guiding original-image light reflected from the original, and which moves along the original mounting table;

a lens unit having a lens into which the original-image light enters and placed immediately under a passage on which the first carriage moves;

a charge coupled device assembly for receiving the original-image light passed through the lens and reading an image corresponding to the original-image light;

a lens bracket cover having a bracket portion to which the charge coupled device assembly is attached and a cover portion for covering the lens unit; and a lens base having the bracket portion of the lens bracket cover attached thereto, for supporting the lens unit.

The lens bracket cover is attached to the bracket portion and further comprises a magnification adjusting mechanism for adjusting the magnification of the lens.

The lens bracket cover is attached to the bracket portion and further comprises a height adjusting mechanism for adjusting the height of the CCD assembly.

The lens bracket cover has an incident window portion for guiding light emitted from the light source restrictively to the lens.

The lens bracket cover is attached to the cover portion and further comprises an original detecting sensor for detecting the original placed on the original mounting table.

The lens bracket cover is attached to the cover portion and further comprises an electrical fan for cooling the CCD assembly.

The apparatus further comprises a scanner electrical circuit board electrically connected to the charge coupled device assembly and a board cover placed immediately under the path on which the first carriage moves, and placed next to the lens bracket cover, for covering the scanner electrical circuit board. In this case, the charge coupled device assembly a CCD line sensor which receives the original-image light passed through the lens and photoelectrically converts an image corresponding to the original-image light, and a printed board for sending an electric signal photoelectrically converted to the scanner electrical circuit board. Incidentally, it is preferable that the bracket portion and the cover portion of the lens bracket cover be integrally formed by press molding.

The clearance G4 formed between the lens bracket and the lens may be substantially zero by arranging the lens bracket cover and the lens such that an inner surface of the lens bracket cover and an upper surface of the lens come in contact with each other.

Furthermore, the clearance G3 formed between the lens bracket cover and the first carriage may fall within a range of 3.5 to 4.0 mm.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Now, preferable embodiments of the present invention will be explained with reference to the accompanying drawings.

Figure 6:
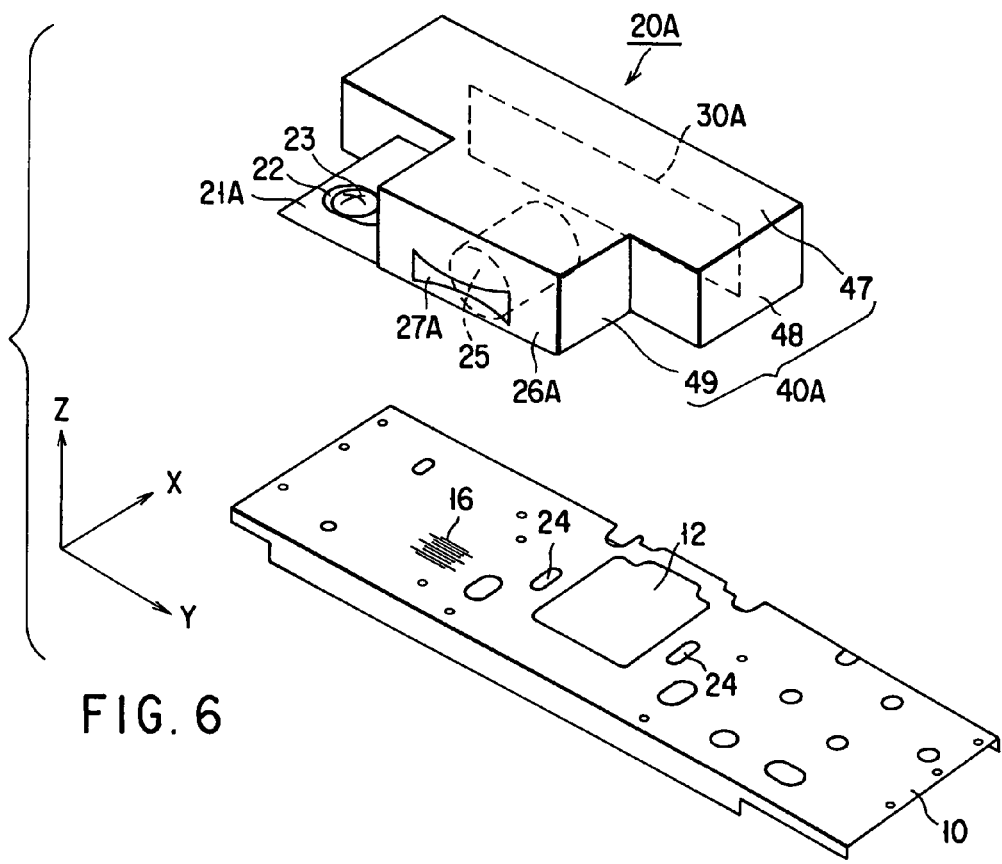
FIG. 6 is an exploded perspective view showing a lens unit of the present invention.
Figure 5:
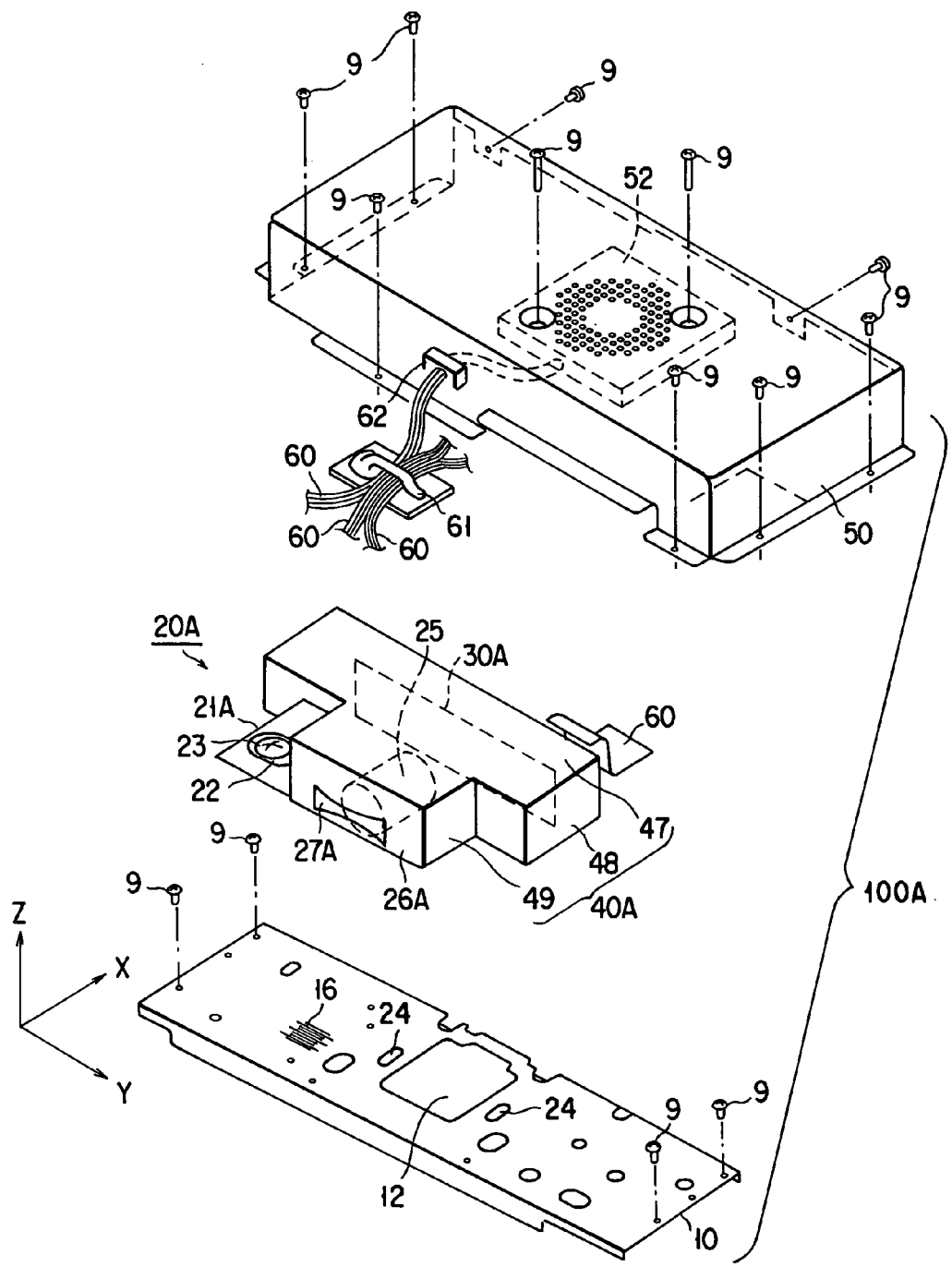
FIG. 5 is an exploded perspective view showing a scanner unit of the present invention.
Figure 8:
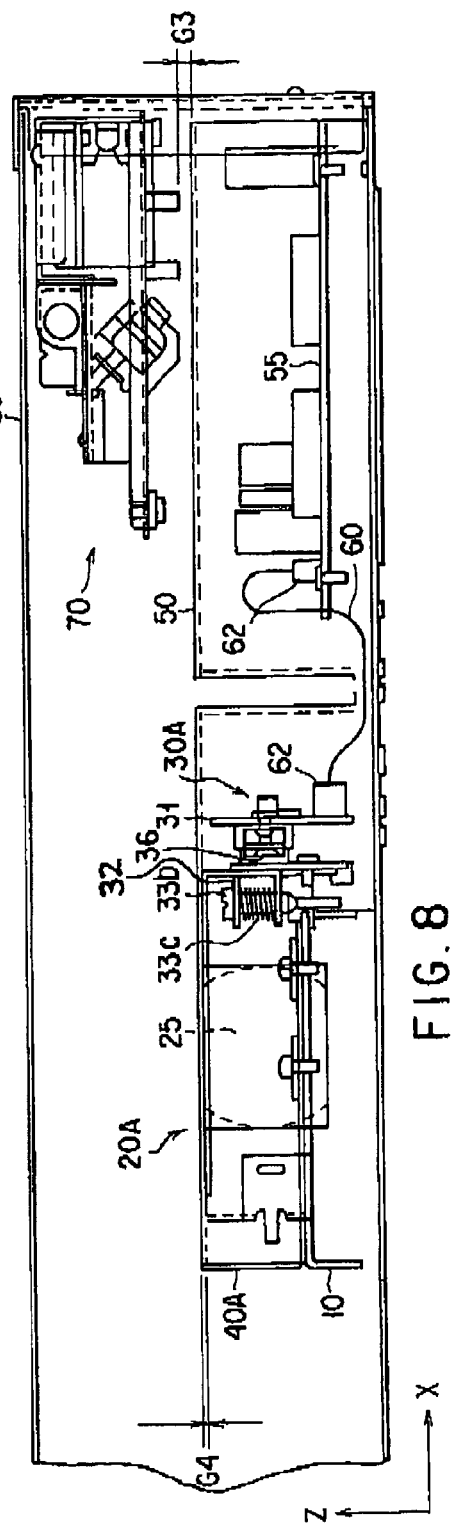
FIG. 8 is an inner perspective sectional view showing a scanner unit of the present invention.
Figure 9:
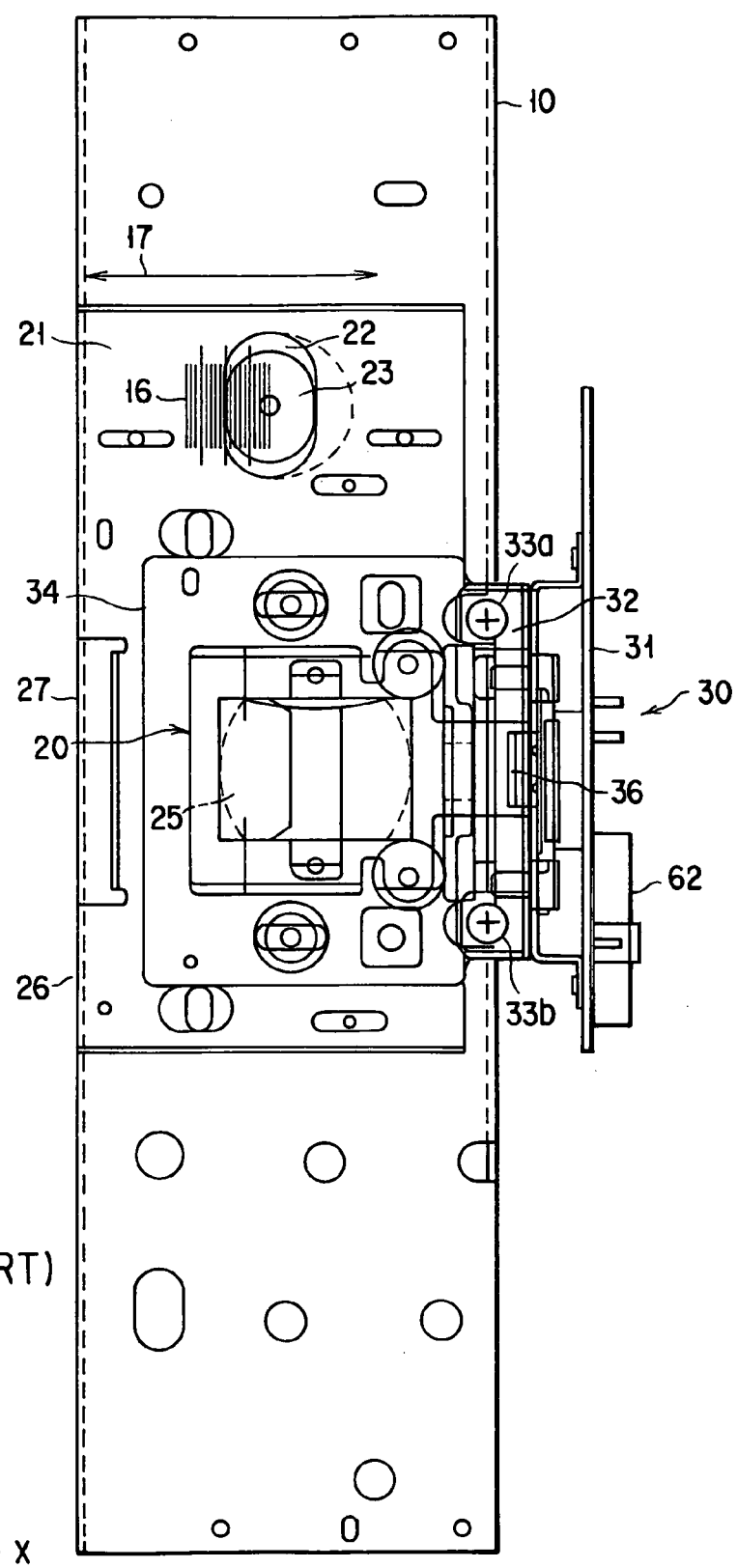
FIG. 9 is an enlarged plan view showing a conventional lens unit.
Figure 10:
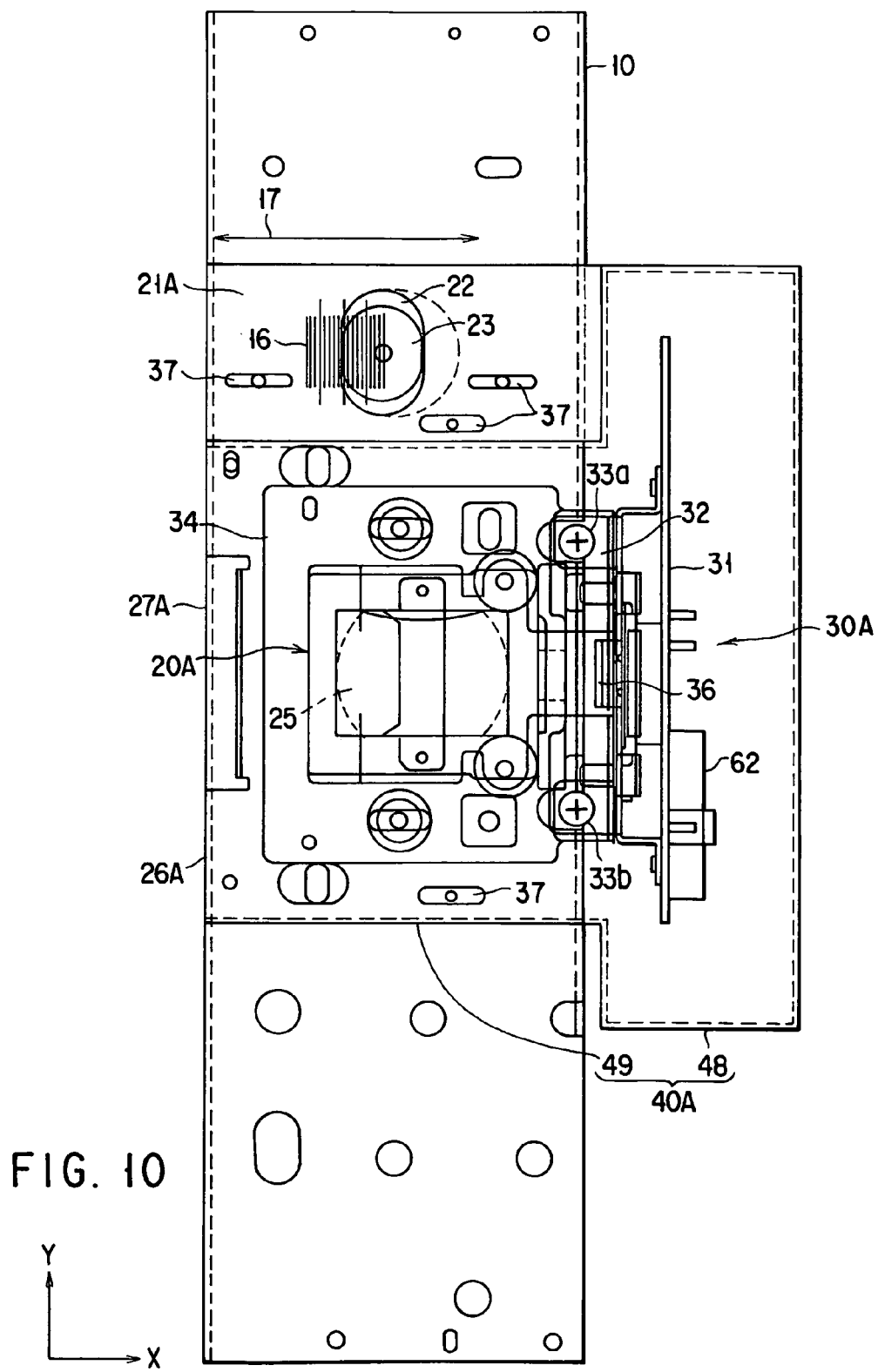
FIG. 10 is an enlarged plan view showing a lens unit of the present invention.

FIG. 5 is an exploded perspective view showing a scanner unit 100A of an embodiment of the present invention. FIG. 6 is an exploded perspective view showing a lens unit of an embodiment of the present invention. FIG. 8 is an inner perspective sectional view sowing the scanner unit 100 A of an embodiment of the present invention. FIG. 10 is a plan view showing a lens unit 20A and a CCD assembly 30A according to an embodiment of the present invention.

A digital copying machine has the scanner unit 100A serving as an image reading apparatus for reading an image of an original 2 placed on an original glass 5. The scanner unit 100A is surrounded by a base frame 80 constituting a part of the frame of the copying-machine main body. The base frame 80 houses a first carriage 70, a second carriage (not shown), a lens unit 20A, CCD assembly 30A, a lens bracket cover 40A, scanner electrical circuit board 55, and a board cover 50, etc.

The scanner electrical circuit board 55 is covered with the board cover 50. The board cover 50 is placed next to the lens bracket cover 40A. The upper surface of the board cover 50 and the upper surface of the lens bracket cover 40A are arranged at the same level (height). The first carriage 70 is designed to move in a space right above both the covers 40A and 50. On the other hand, the second carriage (not shown) is designed to move solely in a side space (the left-hand side space in FIG. 8) of the lens bracket cover 40A. The moving stroke (length) of the second carriage corresponds to half of the width of the scanner unit 10A.

The first carriage 70 is movably supported by a first moving mechanism (not shown) so as to move along an X-axis guide rail (not shown). The range scanned by the first carriage 70 virtually corresponds to the whole space obtained by multiplying the width of the scanner unit 100A by the length of the X-axis direction. The first carriage 70 has a light source for applying light onto the original 2 and a first mirror for guiding light reflected from the original 2.

The second carriage (not shown) is movably supported by a second moving mechanism so as to move along the X-axis guide rail (not shown). The range scanned by the second carriage virtually corresponds to approximately half the space obtained by multiplying the width of the scanner unit 100A by the length of the X-axis direction. The second carriage has second and third mirrors (not shown) for reflecting light guided by the first mirror.

The light reflected by the third mirror (not shown) of a second carriage passes through an X-axis optical path, in which a lens 25 and a CCD line sensor 36 are arranged in this order. The lens 25 is movably supported by a driving mechanism (not shown). The light reflected by the third mirror is converged on the CCD line sensor 36 through the lens 25 to form an image of a predetermined magnification thereon. The CCD line sensor 36 receives the light passed through the lens 25, and photoelectrically converts it into a conversion signal, and then, sends it to the board 55. To the CCD line sensor 36, an image processing circuit (not shown) is connected. The image processing circuit comprises an amplification circuit, an AD converter, and a shaving corrective circuit, etc and reads image data from the photoelectrically converted signal.

As shown in FIG. 5, an electric fan 52 is attached to the upper inner surface of the board cover 50 to cool the lens unit 20A and the CCD assembly 30A, by air. The cooling fan 52 is connected to a power supply circuit (not shown) by a harness 60 via a relay connector 62. Furthermore, the lens bracket cover 40A houses an original detecting sensor (not shown) and another cooling fan (not shown). These electrical parts (sensor and fan) are separately connected to the power supply circuit (not shown) by the harnesses 60. A plurality of harnesses 60 is collectively clamped by a harness clamp 61 fitted to the base frame 80. Incidentally, as shown in FIG. 8, the circuit of the CCD printed board 31 is connected to the circuit of the scanner electrical circuit board 55 by the harness 60.

Now, the lens unit 20A of the present invention will be compared to a conventional lens unit 20, with reference to FIGS. 3 to 10.

In the lens unit 20 of a conventional apparatus, the lens bracket 21 is arranged under the lens 25, as shown in FIGS.

3 and 4. All structural parts 31–34 of the CCD assembly 30 and the lens 25 are stacked on the lens bracket 21.

In contrast, in the lens unit 20A of the apparatus of the present invention, the lens bracket cover 40A is arranged over the lens 25, as shown in FIGS. 5 and 6. All structural parts 31–34 of the CCD assembly 30A are attached on the lens bracket cover 40A upside down (as compared to the right side up attachment for FIG. 4). The lens bracket cover 40A has side surfaces 48 and 49 which separately cover the front, rib, lens side, and CCD side. The side surfaces 48 and 49 are formed continuously from an upper surface 47 by folding the edge thereof at the right angle by a press-molding machine.

As shown in FIG. 10, a plurality of slots is formed in the lower portion of the lens bracket cover 40A. The slots 37 are formed at the positions corresponding to those of slots 24 formed in the lens base 10. Screws 9 are passed through the corresponding slots 24 and 37 to fix the lens bracket cover 40A, slidably in the X-axis direction, to the lens base 10.

Furthermore, a bracket portion 21A projects from a side of the lens bracket cover 40A along the Y direction (See FIGS. 5, 6 and 10). An oval hole 22 is formed in the bracket portion 21A. Into the oval hole 22, an oval cam 23 is inserted. The scale 16 is calibrated on the bracket portion 21A for use in rescaling. The distance between the lens 25 and the CCD 36 can be read by using the scale 16. When the oval cam 23 is turned by a plus driver while reading the scale 16, the CCD assembly 30A moves together with the lens bracket cover 40A in the direction of an arrow 17 (X-axis direction) to the lens base 10. In this way, the magnification of the lens can be adjusted to a desired value.

In the front of the lens 25, an incident window portion 26A having a slit 27A is formed, through which light beam emitted from the light source lamp of the first carriage 70 enters into the lens 25. The incident window portion 26A is a part having a light-shield function which prevents excessive light and other light noise from entering into the lens 25. On the optical axis of the lens 25, the CCD line sensor 36 is arranged to detect light passed through the lens 25.

Figure 1:
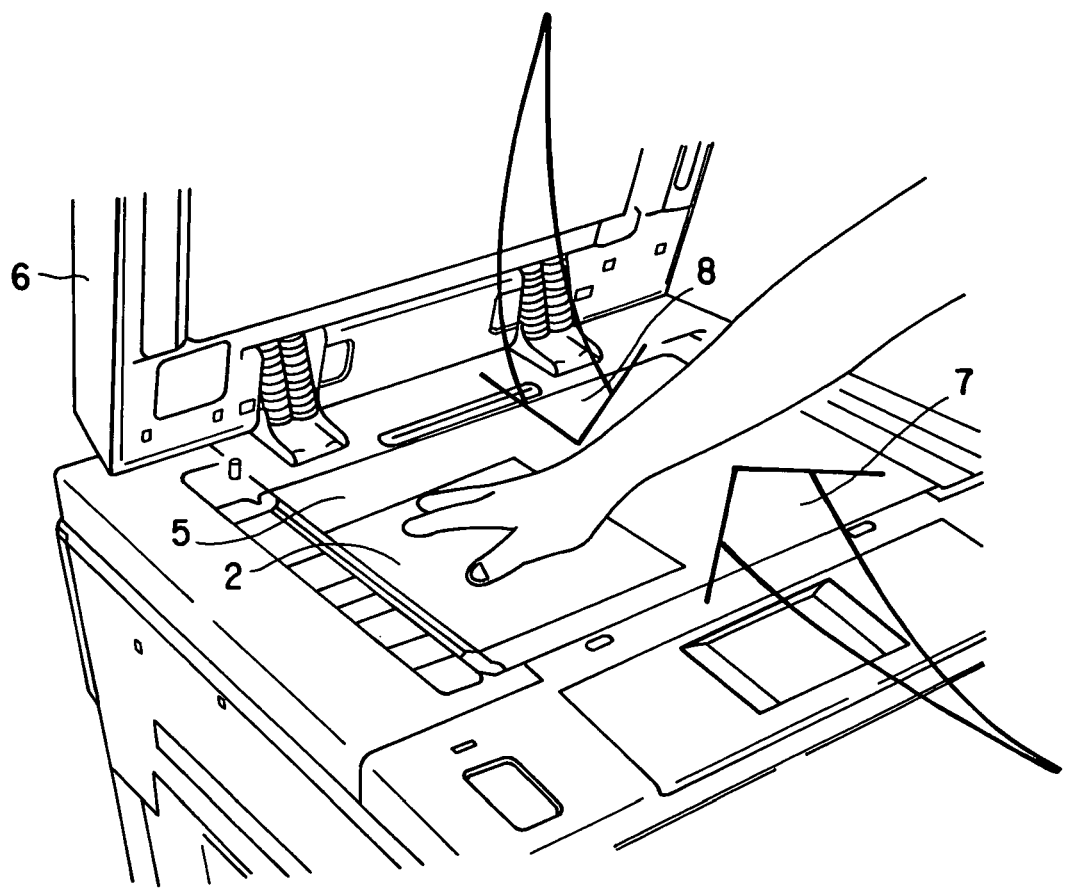
FIG. 1 is a perspective view showing an upper portion of a copying machine, for explaining problems of a conventional apparatus.
Figure 2:
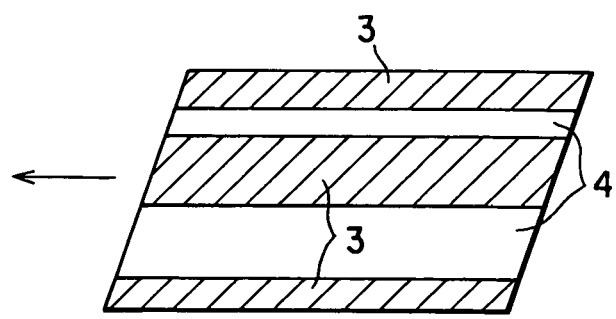
FIG. 2 is a schematic plan view of a copied paper sheet, for explaining problems of a conventional apparatus.
Figure 3:
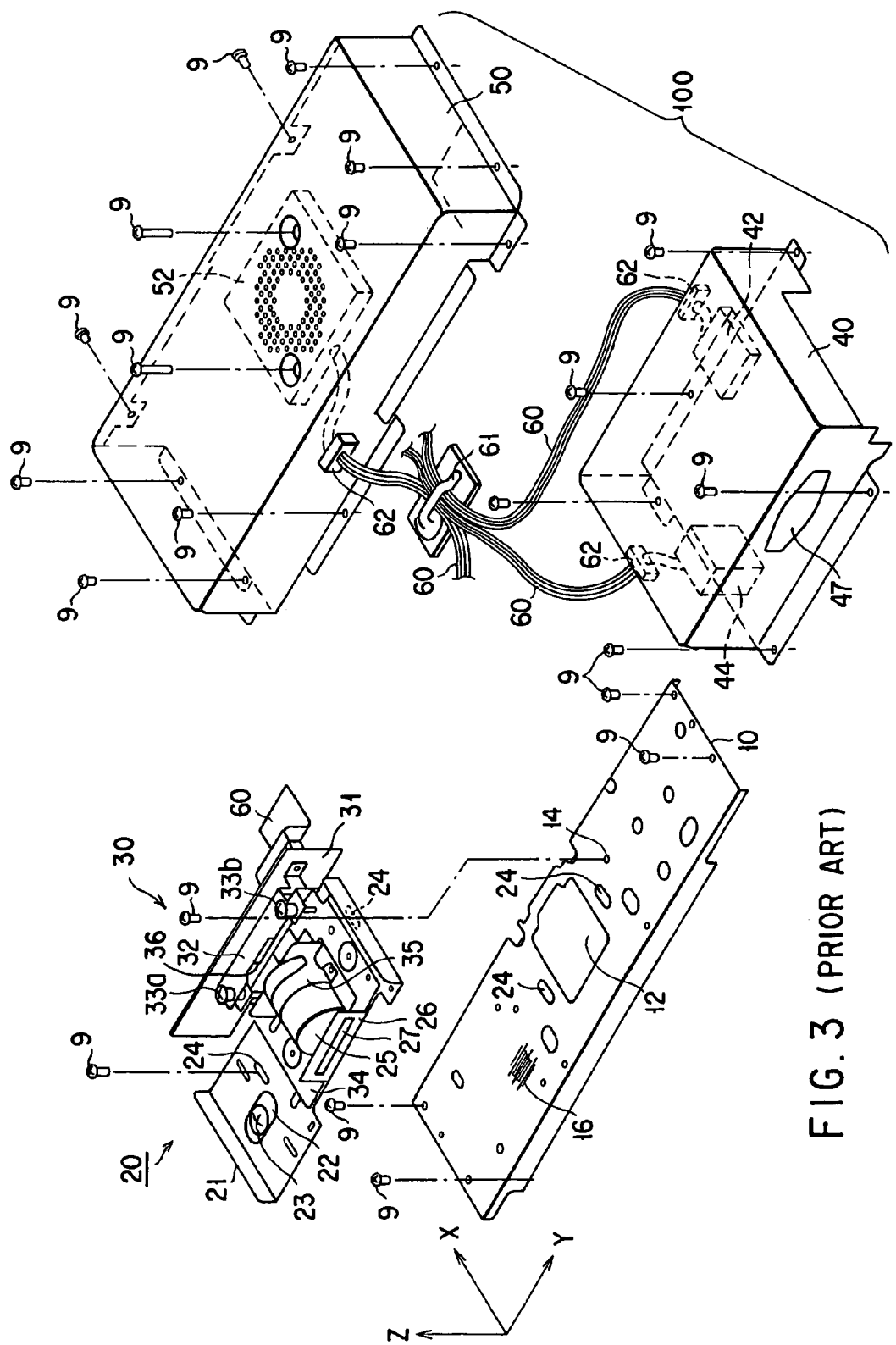
FIG. 3 is an exploded perspective view showing a conventional scanner unit.
Figure 4:
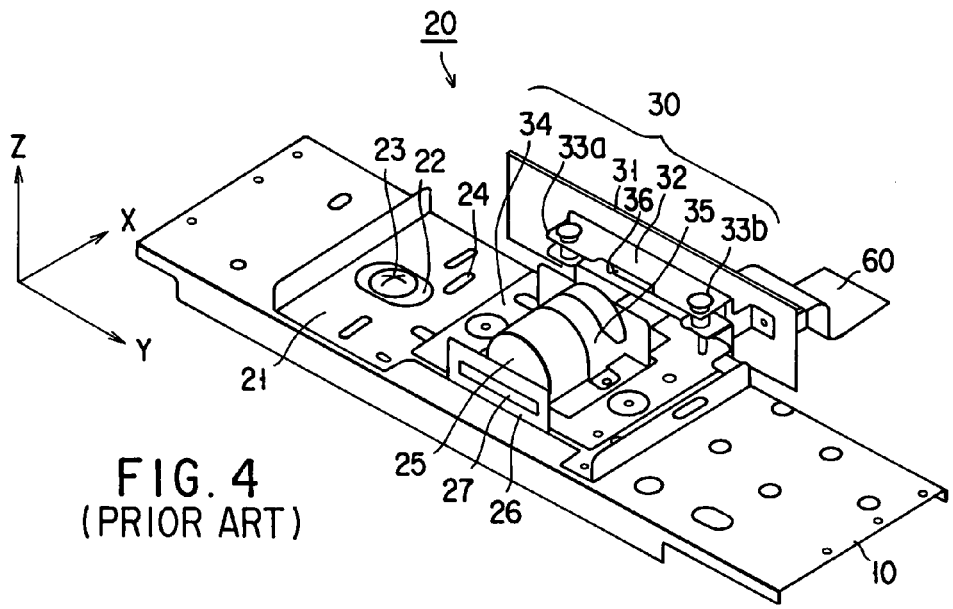
FIG. 4 is a perspective view showing a conventional lens unit.

In the conventional lens unit 20, an incident window portion 26 is provided in the front of the lens 25 as shown in FIGS. 3 and 4. The incident window portion 26 has a slit 27, which act as an appropriate aperture depending upon delivered light from a light-source lamp and the feature of the lens 25. The incident window portion 26 is either continuously formed from the lens bracket 21 by folding it or discretely formed as a dedicated bracket.

In contrast, in the lens unit 20A of the present invention, the incident window potion 26A is formed as a part of the lens bracket cover 40A, as shown in FIGS. 5 and 6. The incident window portion 26A is integrally formed by press-molding together with the bracket portion 21A and side surfaces 48 and 49 of the lens bracket cover 40A. This feature contributes to a reduction of the manufacturing cost.

The lens 25 is inserted, at the bottom, in a patterned opening 12 of the lens base 10 and mounted on the upper base 34, while being held by a holder 35. The upper base 34 is a discrete part independent of the lens bracket cover 40A and the CCD assembly 30A and cannot be moved by the magnification adjusting mechanism having the oval cam 23.

The CCD assembly 30A has a CCD line sensor 36, and a printing board 31, a supporting member 32, and height-adjusting screws 33a and 33b. The CCD line sensor 36 is connected to the circuit of the printing board 31, which is further connected to an image processing circuit by way of the relay connector 62 and the harness 60.

The supporting member 32 supports the CCD line sensor 36 and the printing board 31 and is attached to the lens bracket cover 40A. To the supporting member 32, a pair of bilateral adjusting screws 33a and 33b are attached. As shown in FIG. 8, a spring 33c is attached to the screw portions of the height-adjusting screws 33a and 33b. When the height-adjusting screw 33a and 33b are turned, the supporting member 32, printing board 31, and CCD line sensor 36 move up and down together, thereby adjusting the height of the CCD line sensor 36 to the lens 25.

Now, the scanner unit 100A of the present invention will be explained in comparison with the conventional scanner unit 100 with reference to FIGS. 7 and 8.

Figure 7:
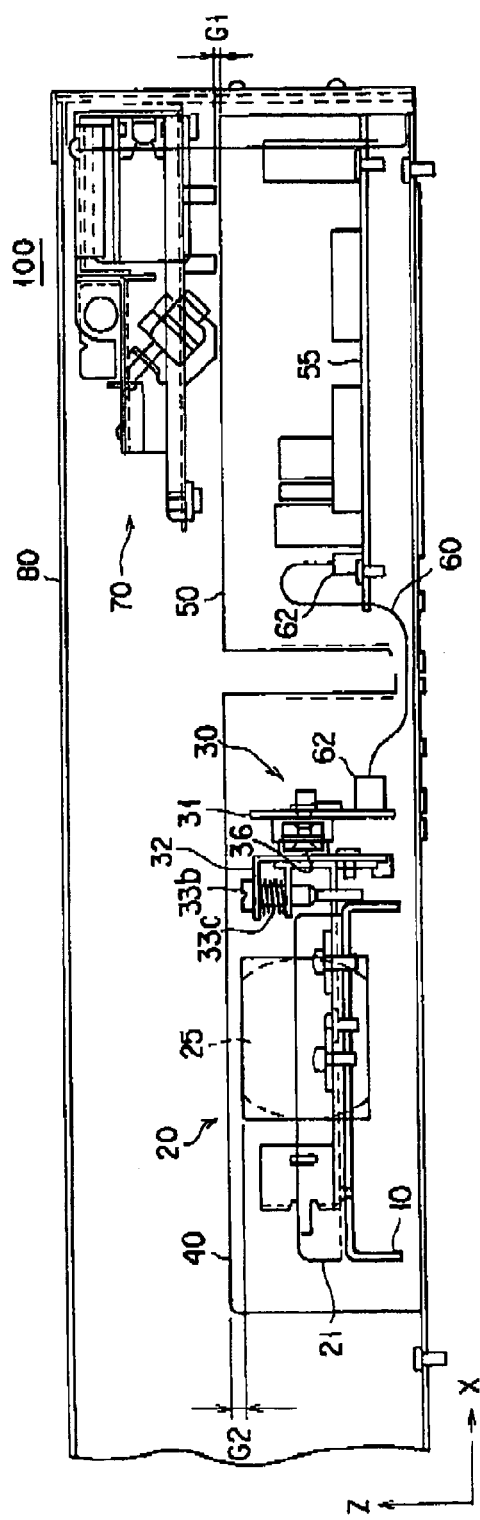
FIG. 7 is an inner perspective sectional view showing a conventional scanner unit.

In the conventional scanner unit 100 shown in FIG. 7, the lens cover 40 requires a height allowance which equates to the margin corresponding to a height-adjusting stroke of a CCD assembly 30+α. Accordingly, enough room can be given to and thus widen the clearance G2 between the lens 25 and the lens cover 40. On the contrary, the clearance G1 between the first carriage 70 and the lens cover 40 is extremely narrowed. To explain more specifically, since the clearance G2 is set at 4 mm in the conventional scanner unit 100, the clearance G1 is restricted down to 1 to 1.5 mm. Therefore, to prevent collision of the first carriage 70 and the lens cover 40, the first carriage 70 and the lens cover 40 must be precisely fixed. If the clearance G1 is widened to prevent the collision of both members 40 and 70, the overall height of the scanner unit 100 increases, enlarging the size of the apparatus.

On the other hand, in the scanner unit 100A of the present invention shown in FIG. 8, it is sufficient that the allowance of the lens bracket cover 40A is equal to the stroke for height-adjusting the stroke of the CCD assembly 30A. Therefore, the height of the lens bracket cover 40A can be reduced until the inner surface of the lens bracket cover 40A almost comes into contact with the upper surface of the lens 25. In this case, assuming that the height of the scanner unit 100A is the same as that of the conventional scanner unit 100, the clearance G3 between the first carriage 70 and the lens bracket cover 40A can be widened up to 3.5 to 4.0 mm. On the other hand, assuming that the clearance G3 is equal to a conventional clearance G1 (1–1.5 mm), the height of the scanner unit 100A can be reduced by about 2.5–3.0 mm from the height of the conventional scanner unit 100.

According to the present invention, since the height of the lens bracket cover can be reduced nearly to the height of the lens, the apparatus can be made smaller than conventional ones.

According to the present invention, since the space formed between the first carriage and the lens bracket cover can be widened, the scanning (moving) speed of the first carriage can be increased. As a result, the performance of the apparatus can be enhanced compared to conventional apparatuses.

The present invention employs the lens bracket cover, which serves as both a bracket and a cover, in place of a conventional lens cover. Therefore, magnification adjustment can be performed without removing the harnesses of electrical parts from a clamp. Hence, the serviceability can be greatly improved compared to conventional ones.

According to the present invention, since the bracket portion for mounting the magnification adjusting mechanism and the incident window portion are integrally formed as parts of the lens bracket cover, the manufacturing cost is reduced.

Furthermore, according to the present invention, the lens unit itself is substantially the same as a conventional one.

Therefore, the same parts of the CCD assembly used in conventional ones can be employed. As described above, since the same parts conventionally used are used in the CCD assembly, it is not necessary to develop the magnification adjusting mechanism and the height adjusting mechanism for a lens unit from the beginning. The development cost can be greatly reduced.

Additional advantages and modifications will readily occur to those skilled in the art. Therefore, the invention in its broader aspects is not limited to the specific details and representative embodiments shown and described herein. Accordingly various modifications may be made without departing from the spirit or scope of the general inventive concept as defined by the appended claims and their equivalents.

What is claimed is:

1. An apparatus for reading an image, comprising:
an original mounting table for mounting an original;
a first carriage which has a light source for irradiating light to the original and an optical system for guiding original-image light reflected from the original, and which moves along the original mounting table;
a lens unit having a lens into which the original-image light enters, disposed immediately under a passage on which the first carriage moves;
a charge coupled device assembly for receiving the original-image light passed through the lens and reading an image corresponding to the original-image light;
a lens bracket cover, attached to the charge coupled device assembly, having a bracket portion, and a cover portion for covering the lens unit and the charge coupled device assembly, the bracket portion and the cover portion being integrally formed by press molding, an inner surface of the cover portion being contacted with an upper surface of the lens; and
a lens base being connected to the bracket portion of the lens bracket cover, for supporting the lens unit.

2. The apparatus according to claim 1, wherein said lens bracket cover further comprises a magnification adjusting mechanism for adjusting a magnification of the lens.

3. The apparatus according to claim 1, wherein said lens bracket cover further comprises a height adjusting mechanism for adjusting a height of the charge coupled device assembly.

4. The apparatus according to claim 1, wherein said lens bracket cover has an incident window portion for guiding light emitted from the light source restrictively to the lens.

5. The apparatus according to claim 1, wherein said lens bracket cover further comprises an original detecting sensor for detecting the original placed on the original mounting table.

6. The apparatus according to claim 1, wherein said lens bracket cover further comprises an electrical fan for cooling the charge coupled device assembly.

7. The apparatus according to claim 1, further comprising a scanner electrical circuit board electrically connected to said charge coupled device assembly and a board cover disposed immediately under the path on which the first carriage moves, and placed next to the lens bracket cover, for covering the scanner electrical circuit board.

8. The apparatus according to claim 7, wherein said charge coupled device assembly has a CCD line sensor which receives the original-image light passed through the lens and photoelectrically converts an image corresponding to the original-image light, and a printed board for sending an electric signal photoelectrically converted to the scanner electrical circuit board.

9. The apparatus according to claim 1, wherein a clearance formed between the lens bracket cover and the first carriage ranges from 3.5 to 4.0 mm.

10. An apparatus for reading an image, comprising
an original mounting table for mounting an original;
a first carriage which has a light source for irradiating light to the original and an optical system for guiding original-image light reflected from the original, and which moves along the original mounting table;
a lens unit having a lens into which the original-image light enters, disposed immediately under a passage on which the first carriage moves;
a charge coupled device assembly for receiving the original-image light passed through the lens and reading an image corresponding to the original-image light;
a lens bracket cover, attached to the charge coupled device assembly, having a bracket portion, and a cover portion for covering the lens unit and the charge coupled device assembly, the bracket portion and the cover portion being integrally formed, an inner surface of the cover portion being contacted with an upper surface of the lens; and
a lens base being connected to the bracket portion of the lens bracket cover, for supporting the lens unit.

11. An apparatus for reading an image, comprising
an original mounting table for mounting an original;
a first carriage which has a light source for irradiating light to the original and an optical system for guiding original-image light reflected from the original, and which moves along the original mounting table;
a lens unit having a lens into which the original-image light enters, disposed immediately under a passage on which the first carriage moves;
a charge coupled device assembly for receiving the original-image light passed through the lens and reading an image corresponding to the original-image light;
a lens bracket cover, attached to the charge coupled device assembly, having a bracket portion, a cover portion for covering the lens unit and the charge coupled device assembly, and a height adjusting mechanism for adjusting a height of the charge coupled device assembly; and
a lens base being connected to the bracket portion of the lens bracket cover, for supporting the lens unit.

* * * * *